(12) United States Patent
Ikegami (10) Patent No.: US 7,773,998 B2
(45) Date of Patent: Aug. 10, 2010

(54) WIRELESS COMMUNICATION APPARATUS FOR SELECTING FREQUENCY CHANNELS

(75) Inventor: Fumihiko Ikegami, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 227 days.

(21) Appl. No.: 11/064,086

(22) Filed: Feb. 24, 2005

(65) Prior Publication Data

US 2005/0197131 A1 Sep. 8, 2005

(30) Foreign Application Priority Data

Feb. 24, 2004 (JP) ............................. 2004-047998

(51) Int. Cl.
*H04W 72/00* (2009.01)
*H04B 7/00* (2006.01)
*H04W 4/00* (2009.01)

(52) U.S. Cl. ............... 455/452.2; 455/450; 455/452.1; 455/509; 455/513; 370/329

(58) Field of Classification Search .......... 455/450, 455/452

See application file for complete search history.

(56) References Cited

U.S. PATENT DOCUMENTS

| | | | | |
|---|---|---|---|---|
| 5,666,655 A * | 9/1997 | Ishikawa et al. | ............ | 455/512 |
| 5,699,365 A * | 12/1997 | Klayman et al. | ............ | 714/708 |
| 5,745,487 A * | 4/1998 | Hamaki | ............ | 370/352 |
| 5,815,507 A * | 9/1998 | Vinggaard et al. | ............ | 714/704 |
| 5,898,928 A * | 4/1999 | Karlsson et al. | ............ | 455/450 |
| 5,937,002 A * | 8/1999 | Andersson et al. | ............ | 375/131 |
| 6,028,892 A * | 2/2000 | Barabash et al. | ............ | 375/222 |
| 6,032,045 A * | 2/2000 | Mimura | ............ | 455/446 |
| 6,112,093 A * | 8/2000 | Nordlund | ............ | 455/450 |
| 6,141,565 A | 10/2000 | Feuerstein et al. | | |
| 6,198,924 B1 * | 3/2001 | Ishii et al. | ............ | 455/434 |
| 6,240,126 B1 * | 5/2001 | Ohashi et al. | ............ | 375/132 |
| 6,256,334 B1 * | 7/2001 | Adachi | ............ | 375/132 |
| 6,298,081 B1 * | 10/2001 | Almgren et al. | ............ | 375/132 |

FOREIGN PATENT DOCUMENTS

| | | |
|---|---|---|
| DE | 102 30 889 A1 | 1/2004 |
| JP | 2000-232464 | 8/2000 |
| JP | 2001-326974 | 11/2001 |
| JP | 2002-271336 | 9/2002 |
| JP | 2003-152601 | 5/2003 |
| WO | WO 02/069648 A2 | 9/2002 |

* cited by examiner

*Primary Examiner*—George Eng
*Assistant Examiner*—Nam Huynh
(74) *Attorney, Agent, or Firm*—Oblon, Spivak, McClelland, Maier & Neustadt, L.L.P.

(57) ABSTRACT

A wireless communication apparatus and a frequency channel selecting method. The wireless communication apparatus includes a transmitting/receiving unit, a storage unit storing updateable indexes relating to a communication condition, an evaluation reference updating unit for updating a reference of a communication quality based on the stored indexes, and a controller that selects frequency channels to communicate data and instructs the transmitting/receiving unit to switch to the selected frequency channels. The frequency channel selecting method includes updating an index representative of a communication quality of a wireless communication for each of a plurality of frequency channels, storing the updateable indexes, updating a reference of a communication quality based on the stored indexes, and selecting frequency channels for communicating based on the updated reference. The communication apparatus and frequency selecting method readily and flexibly select frequency channels with an acceptable communication quality using the updateable index and reference.

10 Claims, 6 Drawing Sheets

Fig.1

| FREQUENCY CHANNEL | PACKET ERROR OCCURRING RATE |
|---|---|
| 0 | 0.2 |
| 1 | 0.22 |
| 2 | 0.18 |
| ............ | ............ |
| 77 | 0.005 |
| 78 | 0.001 |

| FREQUENCY CHANNEL | CHANNEL QUALITY |
|---|---|
| 0 | BAD |
| 1 | BAD |
| 2 | BAD |
| ............ | ............ |
| 77 | GOOD |
| 78 | GOOD |

WIRELESS COMMUNICATION APPARATUS FOR SELECTING FREQUENCY CHANNELS

CROSS REFERENCE TO RELATED APPLICATIONS

This application is based upon and claims the benefit of priority from the prior Japanese Patent Application No. 2004-47998, filed on Feb. 24, 2004, the entire contents of which are incorporated herein by reference.

BACKGROUND OF THE INVENTION

1. Field of the Invention

The present invention is related to a wireless communication apparatus for communicating while a plurality of frequency channels are switched, and a frequency channel selecting method. More specifically, the present invention is directed to a wireless communication apparatus and a frequency channel selecting method, capable of readily and flexibly selecting frequency channels based upon relative communication qualities.

2. Description of the Related Art

In wireless communication operations, frequency hopping techniques have been utilized, in which one frequency channel is selected from a plurality of usable frequency channels by way of a predetermined algorithm, and a channel selecting operation is repeatedly carried out at a constant time interval. There is a standard for a short range wireless communication using this frequency hopping technique, which is referred to as BLUETOOTH. The BLUETOOTH technique features low power consumption and low cost.

However, the frequency channels which are used in BLUETOOTH systems are also used in standardized wireless LAN (Local Area Network) systems, such as, for instance, IEEE 802.11b.

As a result, in conventional wireless systems, frequency channels have been selected in accordance with the following methods. That is, an error occurring rate of a packet which is transmitted is measured for each frequency channel, and a frequency channel is avoided if its packet error occurring rate exceeds a predetermined value. Also, an RSSI (Received Signal Strength Indication) is measured in each channel in order to specify a frequency channel being used in a wireless communication by another communication apparatus, and if specified, such a frequency channel is avoided based upon the measurement result. A packet error may occur when a wireless communication by one wireless communication apparatus interferes with that of another wireless communication apparatus.

However, the method for setting the threshold value with respect to the result of each of the channels in order to select such a frequency channel used in the wireless communication has the problem that the selected frequency channel is not evaluated in relation to other frequency channels. For instance, there is no problem if a sufficiently large number of frequency channels whose communication qualities are higher than the threshold value can be secured. However, there are possibly some cases, where a total number of communication apparata is increased, in which frequency channels having necessary communication qualities cannot be secured over the entire communication system. In such a difficult case, it is desirable that a frequency channel which is presently used be continuously used in order to reduce interference with respect to other wireless communications if the following conditions are satisfied. That is, even when the communication quality of the frequency channel being used is deteriorated and exceeds a present threshold value, it is evaluated that the communication quality of the presently used frequency channel is relatively better than other frequency channels.

To select a frequency channel having a relatively better communication quality, a sorting method may be conceived by which error occurring rates of selectable frequency channels and received signal strength indications are sorted. However, processing cost required for executing the sorting operation is high and power consumption consumed in this sorting process operation is also high.

SUMMARY OF THE INVENTION

In part, due to the above deficiencies in the art, the present invention has been made to solve or minimize the above-explained problems, and therefore, has an object to provide a wireless communication apparatus and a frequency channel selecting method, capable of readily and flexibly selecting a frequency channel having a relatively better communication quality.

Accordingly, a wireless communication apparatus, according to one aspect of the present invention includes a wireless transmitting/receiving unit employing a plurality of frequency channels derived by dividing predetermined frequency ranges; a communication condition memory configured to store an updateable index indicative of a communication condition in each of the frequency channels; an evaluation reference updating unit configured to update a reference of a communication quality in the wireless communication based upon a plurality of the indexes stored in the communication condition storage; and a channel switching control unit configured to select at least one frequency channel to be used in the wireless communication from the plurality of frequency channels based upon the updated reference, and to instruct the wireless transmitting/receiving unit to switch to the at least one selected frequency channel.

According to another aspect of the present invention, there is provided a frequency channel selecting method for the wireless communication apparatus, including updating at least one updateable index representative of a communication quality of a wireless communication for each of a plurality of frequency channels, which have been derived by dividing predetermined frequency ranges; storing the at least one updateable index; updating a reference of a communication quality based upon a plurality of stored updateable indexes; and selecting at least one frequency channel to communicate data from said plurality of frequency channels based upon said updated reference.

Thus, according to the present invention, an index indicative of a communication quality is updated based upon information which is acquired upon executing a communication, and then, a reference value for selecting a frequency channel is flexibly changed in response to this updated index. Also, as previously explained, in such a case that an error occurring rate is high over an entire frequency range, a threshold value is calculated based upon this error occurring rate and the communication requirements. As a result, even if an error occurring rate is high when a frequency channel is viewed on an individual basis the frequency channel is evaluated with respect to other frequency channels, and thus, a frequency channel which should be used can be selected in a flexible manner.

BRIEF DESCRIPTION OF THE SEVERAL VIEWS OF DRAWING

These and other advantages of the invention will become more apparent and more readily appreciated from the following detailed description of the exemplary embodiments of the invention taken in conjunction with the accompanying drawings, where.

DETAILED DESCRIPTION OF THE INVENTION

First Embodiment

First, a description is made of both the standard of BLUETOOTH and the standard of IEEE 802.11b, corresponding to the standard for performing wireless communications, which commonly use frequency channels of 2.4 GHz, as an example. In BLUETOOTH, a frequency range from 2.402 GHz up to 2.480 GHz is subdivided into 79 pieces of frequency channels every 1 MHz, and one frequency channel is selected from these frequency channels by employing a predetermined pseudo random algorithm, and then, this one selected frequency channel is used. On the other hand, in a wireless communication apparatus operable in accordance with the IEEE 802.11b standard, while no frequency hopping is carried out, a communication operation is carried out by using a frequency which has been continuously and fixedly set. The frequency range which is used in IEEE 802.11b is defined to overlap with substantially 22 channels among the 79 frequency channels defined in BLUETOOTH.

As a consequence, if a frequency channel which has been first selected by a communication apparatus for communicating in the BLUETOOTH mode using frequency hopping is overlapped with a frequency range which has already been used in the IEEE 802.11b mode, then these signals may interfere with each other, which may disturb the wireless communications in both the BLUETOOTH mode and the IEEE 802.11b mode.

Also, in communications between the Bluetooth modes, there are some problems in selecting frequency channels. In the case of BLUETOOTH, one closed network is formed which is called a "piconet." In some cases the same frequency channel is selected between different piconets. When selectable frequency channels are in short supply, there is a high possibility that the same frequency channel is selected between different piconets. If the same frequency channel is selected by way of frequency hopping, then interference with other communication apparatuses may appear. As a result, communication quality deteriorates.

Figure 1:
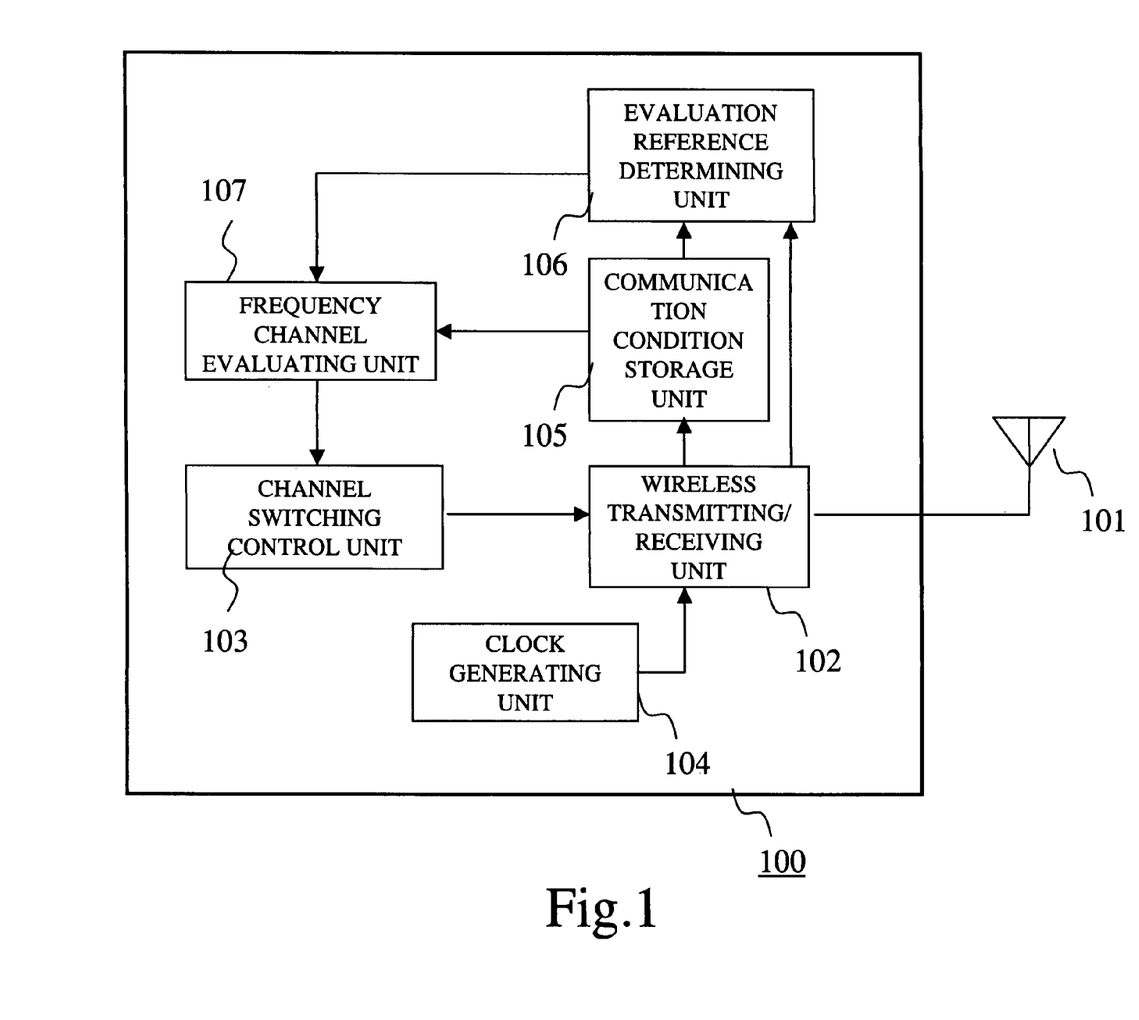
FIG. 1 is a block diagram indicating an example of a communication apparatus according to an embodiment of the present invention.

FIG. 1 is a block diagram schematically indicating an arrangement of a wireless communication apparatus 100 according to an embodiment of the present invention.

FIG. 1 illustrates an antenna 101, a wireless transmitting/receiving unit 102, a channel switching control unit 103, a clock generating unit 104, a communication condition storage unit 105, an evaluation reference determining unit 106, and a frequency channel evaluating unit 107.

A signal which is entered from the antenna 101 is subjected to wireless communication signal processing by the wireless transmitting/receiving unit 102. At this time, the channel switching control unit 103 instructs when any one of frequency channels may be transmitted/received in order to communicate using frequency hopping. The wireless transmitting/receiving unit 102 to which the frequency channel to be transmitted/received has been instructed performs a switching operation of transmitting/receiving frequency channels in response to a clock timing produced by the clock generating unit 104.

The communication condition storage unit 105 stores an index indicative of a communication condition with respect to each of the frequency channels. This communication condition corresponds to an error occurring rate of a packet for every frequency channel, which has been measured by the wireless transmitting/receiving unit 102 during the wireless communication signal process operation, and also, corresponds to a received signal strength indication (RSSI) of such a wireless signal which is received in a time range other than that for the original communication operation.

The evaluation reference determining unit 106 acquires an index representative of a communication condition from the communication condition storage unit 105, or directly from the wireless transmitting/receiving unit 102. Then, the evaluation reference determining unit 106 determines a threshold value based upon at least one acquired index, while the threshold value constitutes a uniform evaluation reference used to select the respective frequency channels. At this time, this threshold value is dynamically changed by considering communication conditions over all the frequency channels in response to the communication conditions. In such a case that an overall communication condition over all of the frequency channels is poor, the threshold value is set to be a higher threshold value. Conversely, in such a case that an overall communication condition is better as to usable frequency channels, the threshold value is set to be a lower threshold value.

The frequency channel evaluating unit 107 compares a threshold value entered from the evaluation reference determining unit 106 with an index representative of a communication condition stored in the communication condition storage unit 105 to judge a communication quality of each of the frequency channels. For instance, when an index representative of a communication condition exceeds the threshold value, the frequency channel evaluating unit 107 judges that the checked frequency channel is a frequency channel whose communication quality is poor. The judgement result is stored in a usable channel information table included in the frequency channel evaluating unit 107, and this judgement result is reflected in an instruction for switching a frequency channel by the channel switching control unit 103.

Figure 2:
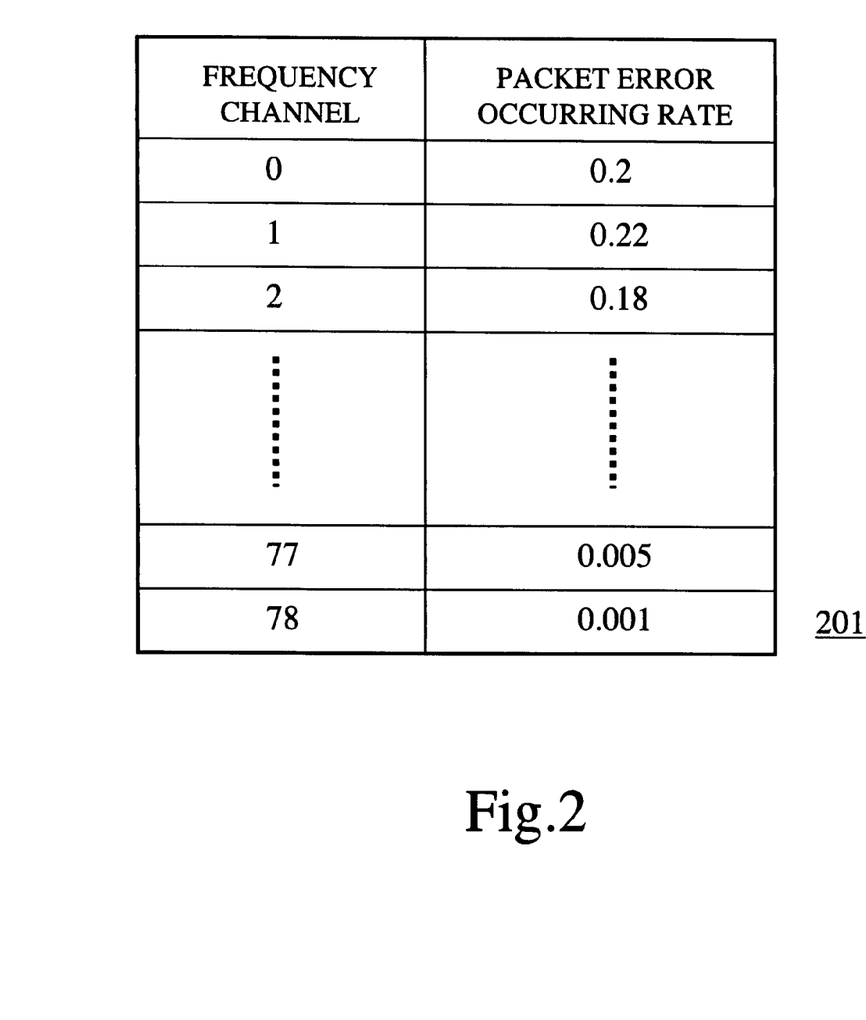
FIG. 2 is a diagram illustrating an example of a communication condition table of an embodiment of the present invention.

FIG. 2 shows an example of a communication condition table 201 employed in the communication condition storage unit 105, into which indexes indicative of communication conditions are stored. In this example, packet error occurring rates for every frequency channel have been stored as the indexes. In this example, a total number of these frequency channels is equal to 79, and the indexes have been described with respect to the respective channels. In FIG. 2, the error occurring rate is employed as the index. Alternatively, a loss rate of packets, a reception frequency of a packet resending request, a received signal strength indication (RSSI), and the like are employed as indexes, these indexes may be similarly handled.

Next, there is shown an example of a simple calculation method for dynamically calculating a value of an index which is stored in the communication condition table 201. Here, a packet error occurring rate is exemplified as the index. Alternatively, even when other sorts of error occurring rates and a received signal strength indication are employed, a similar calculation method may be applied.

First, a packet error occurring rate "PER [i]" with respect to each of the frequency channels is calculated by employing the below-mentioned formula:

$$PER[i]=1/t+(1-1/t) \times PER[i].$$

When there is no error in a packet, an error occurring rate "PER [i]" of this packet is calculated by using the following formula:

$$PER[i]=(1-1/t) \times PER[i].$$

In these formulae, symbol "i" shows an index which corresponds to a BLUETOOTH channel number, and has a value selected from "0" to "78." For instance, a packet error occurring rate in the frequency channel "0" is expressed by PER [0]. Symbol "t" shows a time constant when a response characteristic is determined. The smaller the value of the time constant "t" is, the following characteristic with respect to rapid changes of an error occurring rate is increased, so that convergence is quick. Conversely, another case may also occur. That is, the response characteristic may also respond to an accidental error in a higher sensitivity, and thus, the value "t" may induce a vibration. Therefore, it is preferable that the value "t" is selected to be 128 to approximately 256 by considering such a trade-off relationship. Assuming now that an initial value of PER [i] is "0," every time a packet is transmitted/received in a frequency channel "i," if the packet error occurring rate is repeatedly updated by checking whether or not an error happens to occur due to such a communication in accordance with this calculation method, then the packet error occurring rate PER [i] is converged to the actual packet error occurring rate in accordance with the execution of the updating operation.

In the case that the index calculation is carried out in a simpler manner, if only one index is employed over all the frequency channels as explained below, then a calculation amount for calculating an error occurring rate can be reduced, which is carried out every time a packet is transmitted/received. Similar to the calculation for calculating the packet error occurring rate for every channel, the packet error occurring rate of all the frequency channels is updated based upon the following formula irrespective of the frequency channel used in the packet transmission/reception:

$$PER=1/T+(1-1/T) \times PER.$$

When there is no error in the packet, the packet error occurring rate is defined as follows:

$$PER=(1-1/T) \times PER.$$

In these formulae, symbol "T" denotes a time constant. The time constant "T" is selected to be a value larger than the above-described time constant "t," for example, a value 64 times larger than the time constant "t." This is because it is preferable that the following characteristic which responds to the occurrence of the packet error is gentler than the packet error occurring rate "PER [i]" which is updated every channel.

If such a value which can be expressed by power of "2" is employed as to the above-explained values such as "t," "T," and "n," then a shift calculation becomes applicable to the above-described calculations, so that a calculation amount can be largely reduced. It should be understood that although such values, for instance, t=128, T=8192, n=16 are preferable, the present invention is not limited to these values.

Figure 3:
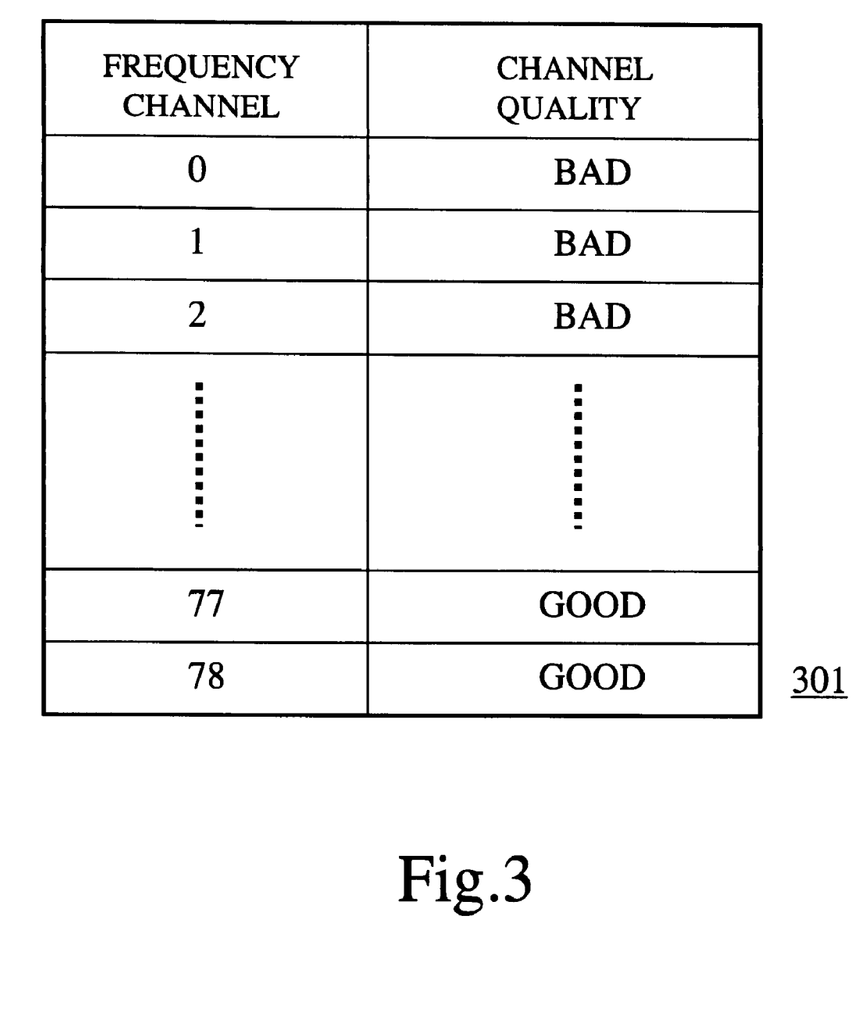
FIG. 3 is an illustration of an example of a usable channel information table of an embodiment of the present invention.

FIG. 3 shows an example as to the usable channel information table 301 provided by the frequency channel evaluating unit 107. This example represents judgement results of the respective frequency channels when the evaluation reference determining unit 106 sets, for example, "0.1" as the threshold value. When the frequency channel "0" is viewed, the error occurring rate thereof is "0.2," which exceeds the above-described threshold value of "0.1." As a result, the communication quality is evaluated as "bad." In this case, even when a received signal strength indication is employed instead of the error occurring rate, if the received signal strength indication similarly exceeds the threshold value, then the frequency channel evaluating unit 107 may evaluate that the possibilities that the communication interferes with other communications becomes high. The channel switching control unit 103 produces a hopping sequence in such a manner that a frequency channel which has been evaluated as "good" based upon the usable channel information table 301 is defined as a frequency hopping subject channel.

Figure 4:
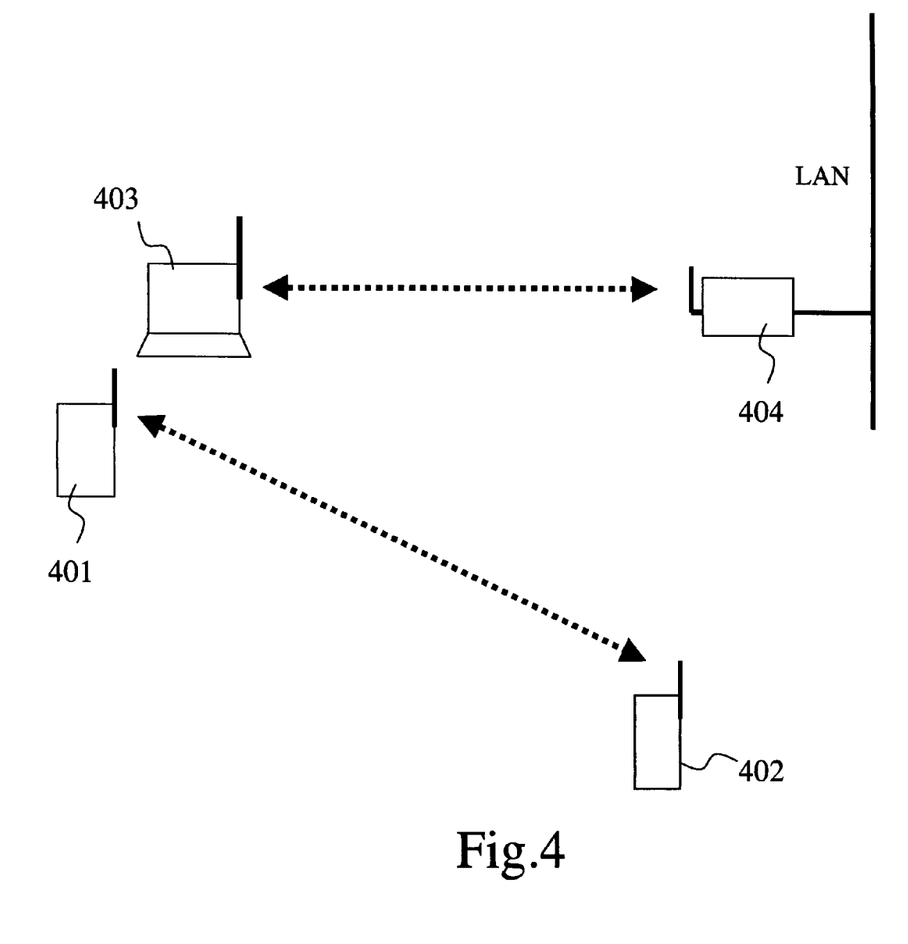
FIG. 4 is a diagram for illustratively showing an example of a use condition of the communication apparatus of this embodiment.

FIG. 4 is a diagram explaining an example as to a use condition of the communication apparatus according to this embodiment. In this example, a description is made of such an adverse influence which is given by, for instance, a communication terminal operated by IEEE 802.11b to a communication terminal operated by BLUETOOTH.

In FIG. 4, an access point 404 is represented which is connected to a LAN. This LAN constitutes such an access point (AP) with respect to communication terminals 401 and 402 of BLUETOOTH, and also, communication terminal 403 and 404 of IEEE 802.11b, and these communication terminals are mutually communicated.

Both the terminal 403 and the access point 404 use a frequency range from 2.402 GHz up to 2.424 GHz in accordance with the IEEE 802.11b standard. As a result, the frequency channel "0" through the frequency channel "21" defined in the BLUETOOTH standard overlap the above-explained frequency range. Accordingly, interferences may occur between both the frequency ranges, so that an error occurring rate is increased, and thus, communication quality is deteriorated.

Figure 5:
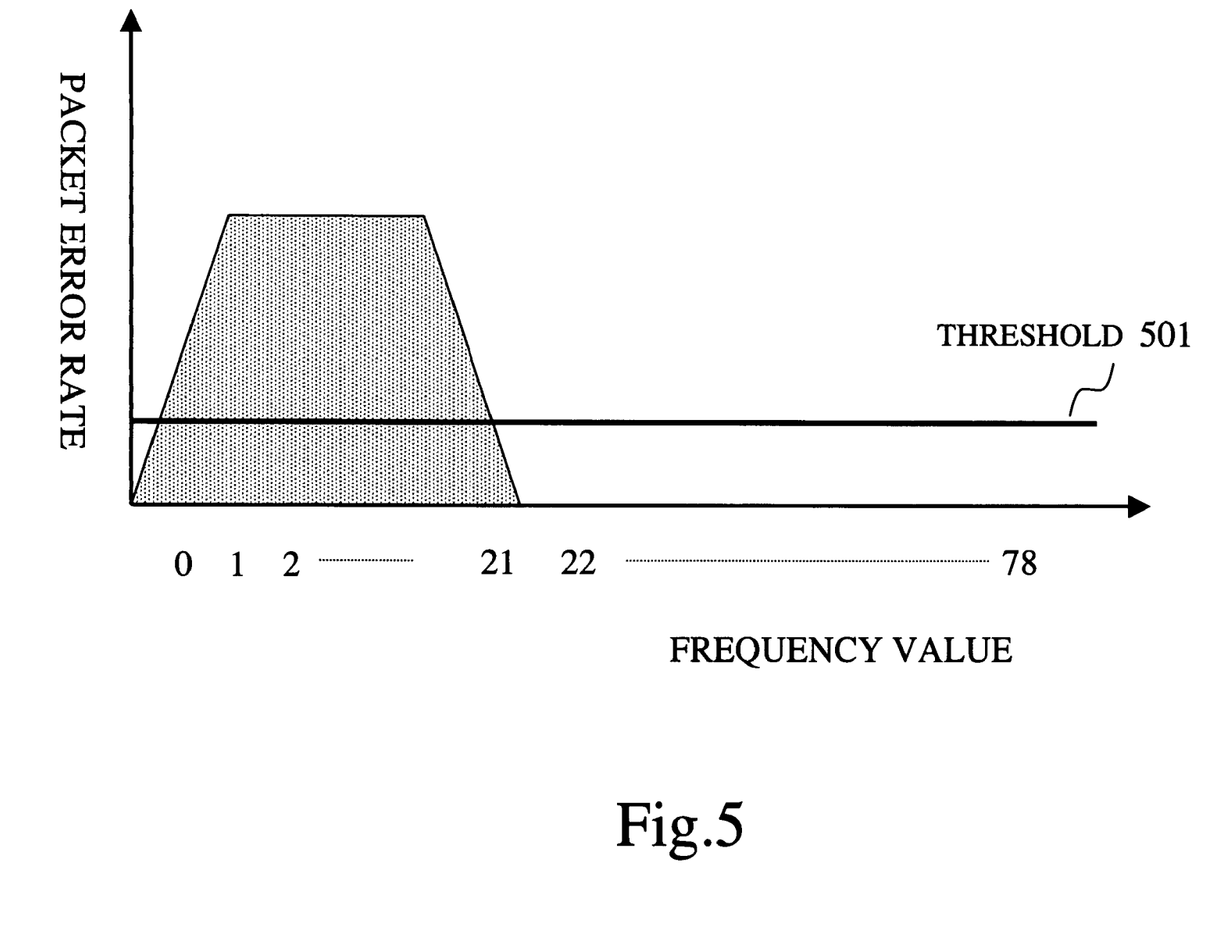
FIG. 5 is a diagram for representing one example of a packet error occurring rate of frequency channels.

FIG. 5 represents an example of the error occurring rate at this time. In the frequency range defined from the frequency channel "0" up to the frequency channel "21," which are overlapped with the frequency range of IEEE 802.11b in the proximity communication, all of error occurring rates are high. However, in the frequency range except for the frequency channel "0" through the frequency channel "21," that is, in the frequency range subsequent to the frequency channel "22," no interference occurs. As a consequence, even when the communication quality is judged based upon the threshold value 501, the communication qualities as to the 57 frequency channels defined from the frequency channel 22 to the frequency channel 78 maybe judged as "good." If these frequency channel ranges can be actually used, then no problem occurs.

In FIG. 4, such a case is considered in which the distance between the terminal 401 and the terminal 402 is increased. Since electromagnetic wave strengths are rapidly decreased when the distance is increased, an adverse influence caused by an externally supplied noise cannot be neglected in wireless communications established between the terminal 401 and the terminal 402. As a consequence, it is conceivable that the communication qualities over all the frequency channels are deteriorated.

Figure 6:
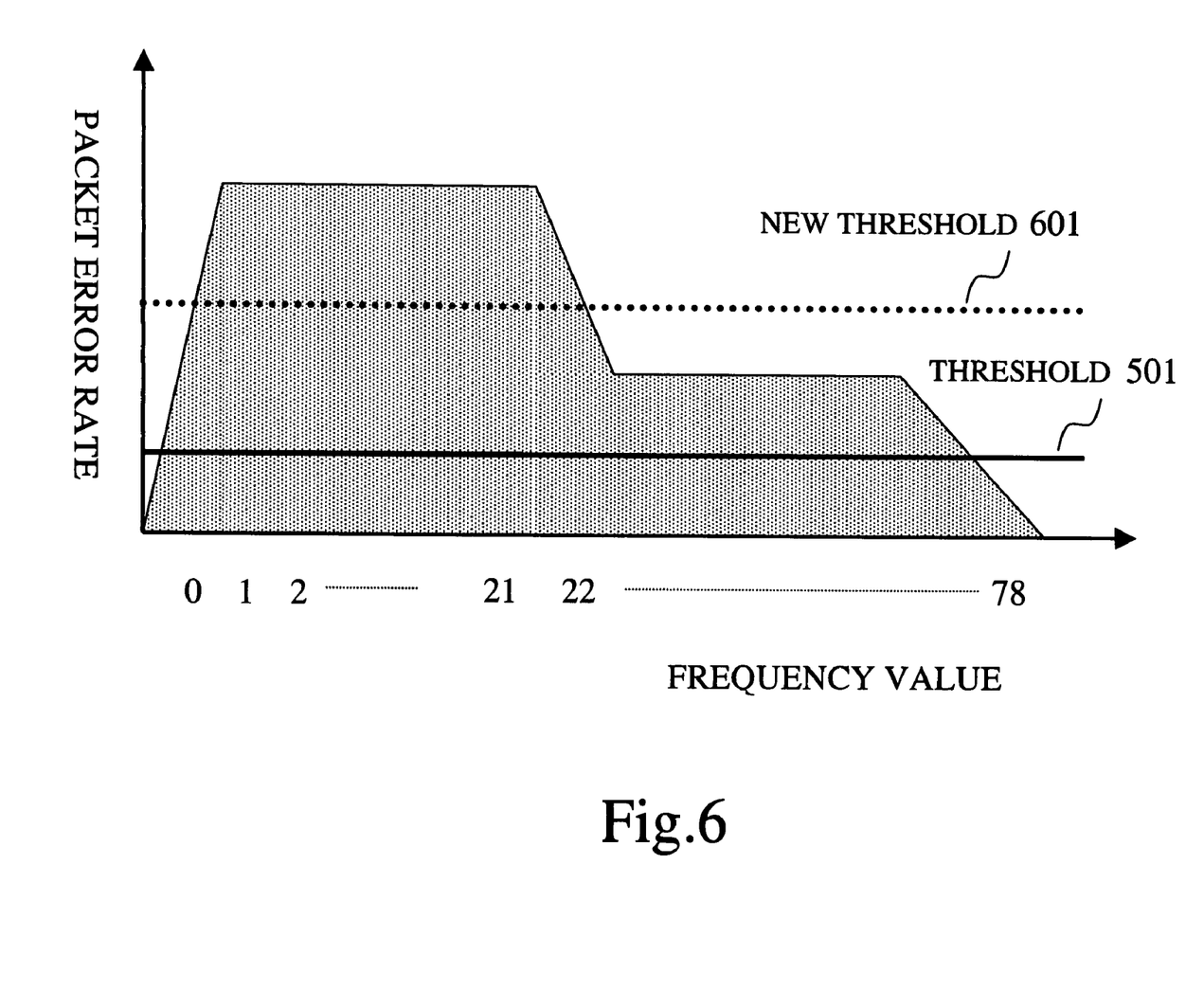
FIG. 6 is a diagram for indicating another example of a packet error occurring rate of frequency channels.

FIG. 6 shows an example as to error occurring rates when the distance between the terminal 401 and the terminal 402 is increased. The overall error occurring rates as to all the frequency channels are increased, as compared with the error occurring rates shown in FIG. 5. At this time, if the threshold value 501 which has been applied under the communication condition of FIG. 5 is applied to the communication condition of FIG. 6, substantially all the frequency channels are evaluated as "bad," so that there is no frequency channel which should be selected by way of the frequency hopping. In such a case, if a new threshold value, that is, another threshold value 601, is again set, then relatively better frequency channels may be selected even while the entire communication quality is deteriorated. In the case of FIG. 6, it is desirable that the frequency channels from channel 22 to channel 78 are evaluated as "good."

It should be noted that in this example, the packet error occurring rate has been indicated as the index representative of the communication condition. Alternatively, even when other indexes are employed, a similar effect may be achieved. That is, an error occurring rate of only a header, from which a bit error occurring rate and a payload of a packet are eliminated, an error occurring rate as to an entire packet including a payload, a packet loss rate, a reception frequency of a packet resend request, or a received signal strength indication may be employed as the index.

Next, a description is made of an example as to a method for setting the new threshold value 601 as shown in FIG. 6. When a new threshold value is set, the evaluation reference determining unit 106 calculates such a new threshold value by employing an index indicative of a communication quality which has been stored in the communication condition table 201 of the communication condition storage unit 105.

The evaluation reference determining unit 106 may set an averaged value of the error occurring rates in the respective frequency channels, as the threshold value, which are defined from "PER [0]" up to "PER [78]" of the communication condition table 201 as shown in FIG. 2. Alternatively, the evaluation reference determining unit 106 may set such a value obtained by multiplying the averaged value by a predetermined coefficient, for example, 1.125 as the threshold value. Even when such a threshold value calculated by way of the above-described simple calculation method is employed, the new threshold value 601 which has been applied to the case that the communication qualities are deteriorated over a large number of frequency channels may be set to be a larger threshold value, as compared with the case that the communication qualities of the entire frequency channels are better. If the evaluation reference determining unit 106 is arranged in the above-described manner, then it is possible to arrange that only such frequency channels whose communication qualities are relatively bad are not used.

Alternatively, as previously explained in the above-described calculation method as to the index of the communication condition table 201, the value (PER) to which the communication conditions of all the frequency channels have been reflected may also be defined as the new threshold value 601. At this time, this value (PER) may be multiplied by a coefficient such as 1.125, if necessary.

Alternatively, the threshold value may be obtained as follows. That is, a predetermined fixed value (for example 0.1) is compared with such a value (for example, $(1+(n-1)\times PER)/n$: symbol "n" being constant) which has been calculated by using PER as an argument, and then a larger value may be employed as this threshold value. This is because when this value is used as the threshold value as it is, there are some possibilities that this value may change in an excessively high sensitive manner with respect to an accidental change of PER [i]. As previously explained, if the threshold value is not excessively made low, then such a problem can be avoided.

Also, by employing as the threshold value, instead of the PER value itself, such a larger value than the PER value, which is calculated by multiplying this PER value by a certain coefficient, a frequency channel whose communication quality is worse may be selected.

For the sake of easy explanation, it has been described that all of the frequency channels evaluated as "good" are the object channels to be selected, however, only a predetermined number (e.g., lower limited number determined in BLUETOOTH of frequency channels out of the frequency channels evaluated as "good" may be used while other frequency channels may be determined as non-used channels.

Dynamically changing the threshold value used to select the frequency channels which can be selected in the frequency hopping is in response to a deterioration in the entire communication quality makes it possible to limit a range of candidate frequency channels to be used to such a range that the communication quality is relatively better, as compared with fixing this threshold value to a predetermined value. Since the frequency channel to be used is selected from the limited range of the frequency, it is possible to select a frequency channel of better communication quality. Since the selection range is further narrowed, an algorithm such as a sorting algorithm may be applied. This sorting algorithm is difficult in a process operation for processing a large number of frequency channels. The sorting algorithm may be applied to characterize packets included in the communicated data.

On the other hand, such a case may be conceived that as a result of evaluation by the frequency channel evaluating unit 107 as to the respective frequency channels, a necessary channel number cannot be secured because all of the evaluated frequency channels could not satisfy the threshold value. In such a case, a new threshold value lower than the threshold value employed in the above-described evaluation is employed to retry the evaluation, so that a larger number of frequency channels may be evaluated as "good." At this time, a lower threshold value is employed in order that the required number of frequency channels may be secured. This new threshold value may be, for example, such a fixed value as 0.08. Alternatively, the new threshold value may be obtained by multiplying the threshold value set by the evaluation reference determining unit 106 by a coefficient smaller than 1 (for example 0.75). After the new threshold value has been set, if the frequency channels are again evaluated by the frequency channel evaluating unit 107, and a total number of such frequency channels which have been evaluated as "good" does not reach the necessary channel number, then the threshold value may be repeatedly lowered until the required number of channels can be secured, or a frequency channel may be randomly selected from the frequency channels evaluated as "bad," to be used.

Second Embodiment

A communication apparatus according to a second embodiment of the present invention is similar to the communication apparatus according to the first embodiment. In this second embodiment, a threshold value which is set by the evaluation reference determining unit 106 is changed in response to a purpose of a communication.

For instance, there is an SCO packet and an ACL packet in the packets which are used in BLUETOOTH. The SCO packet is used in a transmission/reception of voice, and the like. Since this SCO packet requires a real-time characteristic, even when an error happens to occur in transmitting/receiving operations, this packet is merely discarded without being resent. On the other hand, the ACL packet is employed to transmit/receive data, and when an error happens to occur in a transmitting/receiving operation, a resend process operation is carried out in response to a resend request. When the SCO packet transmitting/receiving operation is carried out which does not require the resend process operation, the evaluation reference determining unit 106 sets a threshold value to be higher than a threshold value used when only the ACL packet is transmitted/received which requires the resend process operation. This makes it possible to reduce the number of packets to be discarded when errors occur, and to improve the quality of voice to be transmitted. Conversely, when only the ACL packet is transmitted/received which requires the resend process operation, the evaluation reference determining unit 106 sets a threshold value to be a lower threshold value so that a larger number of frequency channels can be selected. As a consequence, following possibility can be increased, and thus, mutual interference can be reduced. That is, a frequency channel may be flexibly utilized which is different from frequency channels used by other communication apparatuses, these communication apparatuses belonging to a network other than the first network (for example, piconet) and doing independent communication. Even when such an arrangement is employed, since the ACL packet having the resend function is processed by the resend process operation when the packet error occurs, there is no possibility that the data which should be transmitted/received is not lost even in such a case that the frequency channel whose communication quality is low is used.

Third Embodiment

A communication apparatus according to a third embodiment of the present invention is similar to the communication apparatus according to the first embodiment. In this third embodiment, a threshold value which is set by the evaluation reference determining unit 106 is changed in response to an error correction capability of a packet which is transmitted/received.

Among packets used in BLUETOOTH, there are a DH packet and a DM packet. As to this DH packet, although a larger amount of data can be transferred, an error resistive characteristic thereof is low. As to this DM packet, although an amount of data to be transferred is decreased by allocating a portion of the data to an error correction code, an error resistive characteristic thereof is increased. When the DH packet is transmitted/received, the threshold value is set to a higher threshold value so that only a frequency channel whose communication quality is relatively better is used to cut out an error. Also, when the DM packet is transmitted/received, the threshold value is set to a lower threshold value, so that a frequency channel whose communication quality is relatively low can also be selected to widen a channel selecting range. When such an arrangement is employed, while the error rate is reduced when the packet having the low error resistive characteristic is transferred, interference with respect to another communication apparatus belonging to another network (for example, piconet) can be reduced.

The present invention is not limited to the above-described embodiments, but may be embodied by modifying the structural elements in the implementation stage without departing from the technical idea of the present invention. Also, since a plurality of structural elements disclosed in the above-explained embodiments are appropriately combined with each other, various sorts of inventive ideas maybe alternatively accomplished. For example, some structural elements may be deleted from all of the structural elements represented in the embodiments. Furthermore, the structural elements employed in different embodiments may be alternatively combined with each other in a proper manner. It is therefore to be understood that within the scope of the claimed invention, the present invention may be embodied differently than as specifically disclosed herein.

The invention claimed is:

1. A wireless communication apparatus, comprising:
   a transmitting/receiving unit configured to communicate data by employing a plurality of frequency channels derived by dividing predetermined frequency ranges;
   a storage unit configured to store at least one updatable index indicative of a communication condition in each of the frequency channels;
   an evaluation reference updating unit configured to update a reference of a communication quality based upon a plurality of indexes stored in said storage unit; and
   a controller configured to select at least one frequency channel from said plurality of frequency channels to communicate data based upon said reference, and configured to instruct said transmitting/receiving unit to switch to said at least one selected frequency channel, wherein
   the data includes at least one of a first packet that does not require a resend function and a second packet that requires the resend function,
   said controller is further configured to characterize the at least one of the first packet and the second packet which is transmitted/received via the at least one selected frequency channel,
   said transmitting/receiving unit is configured to instruct said evaluation reference updating unit to update the reference to a first reference when the first packet is transmitted and to a second reference when the second packet is transmitted, the first reference being higher than the second reference.

2. The apparatus according to claim 1, wherein said index is a loss rate of packets or a reception frequency of a packet resending request.

3. The apparatus according to claim 1, wherein said storage unit includes a communication condition table into which said at least one updatable index is stored.

4. The apparatus according to claim 3, wherein said communication condition table stores packet error occurring rates for every frequency channel that have been stored as said index.

5. The apparatus according to claim 1, wherein the evaluation reference updating unit is further configured to update the first reference or the second reference in order to control the number of the plurality of frequency channels to be used in frequency hopping.

6. The apparatus according to claim 1, wherein said evaluation reference updating unit is configured to update said first reference or the second reference to a new reference lower than said first reference or the second reference when a number of frequency channels selected by said controller does not satisfy a number of frequency channels required in a wireless communication.

7. The apparatus according to claim 1, wherein said transmitting/receiving unit is configured to instruct said evaluation reference updating unit to update said first reference or the second reference to a new reference higher than said first reference or the second reference when the data which is transmitted/received by said transmitting/receiving unit requires a higher communication quality.

8. A wireless communication apparatus, comprising:
a transmitting/receiving unit configured to communicate data by employing a plurality of frequency channels derived by dividing predetermined frequency ranges;
a storage unit configured to store at least one updatable index indicative of a communication condition in each of the frequency channels;
an evaluation reference updating unit configured to update a reference of a communication quality based upon a plurality of indexes stored in said storage unit; and
a controller configured to select at least one frequency channel from said plurality of frequency channels to communicate data based upon said reference, and configured to instruct said transmitting/receiving unit to switch to said at least one selected frequency channel, wherein
the data includes at least one of a first packet that does not include an error resistive characteristic and a second packet that includes the error resistive characteristic,
said controller is further configured to characterize the at least one of the first packet and the second packet which is transmitted/received via the at least one selected frequency channel,
said transmitting/receiving unit is configured to instruct said evaluation reference updating unit to update the reference to a first reference when the first packet is transmitted and to a second reference when the second packet is transmitted, the first reference being higher than the second reference.

9. A frequency channel selecting method, comprising:
updating at least one updatable index representative of a communication quality of a wireless communication for each of a plurality of frequency channels derived by dividing predetermined frequency ranges;
storing the at least one updatable index;
updating a reference of a communication quality based upon a plurality of stored updatable indexes;
selecting at least one frequency channel used to communicate data from said plurality of frequency channels based upon said updated reference, wherein said data includes at least one of a first packet that does not require a resend function and a second packet that requires the resend function; and
characterizing the at least one of the first packet and the second packet which is transmitted/received via the at least one selected frequency channel, wherein
updating said reference in response to said characterizing to a first reference when the first packet is transmitted and to a second reference when the second packet is transmitted, the first reference being higher than the second reference.

10. A frequency channel selecting method, comprising:
updating at least one updatable index representative of a communication quality of a wireless communication for each of a plurality of frequency channels derived by dividing predetermined frequency ranges;
storing the at least one updatable index;
updating a reference of a communication quality based upon a plurality of stored updatable indexes;
selecting at least one frequency channel used to communicate data from said plurality of frequency channels based upon said updated reference, wherein said data includes at least one of a first packet that does not require a resend function and a second packet that requires the resend function; and
characterizing the at least one of the first packet and the second packet which is transmitted/received via the at least one selected frequency channel,
wherein updating said reference in response to said characterizing to a first reference when the first packet is transmitted and to a second reference when the second packet is transmitted, the first reference being higher than the second reference.

* * * * *